Sept. 20, 1932.  C. HILTEBRANDT  1,878,517
ARTIFICIAL TOOTH
Filed Dec. 31, 1930
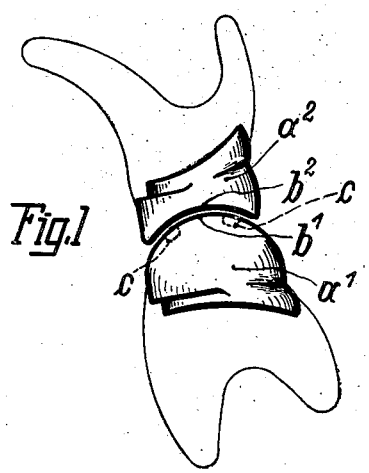
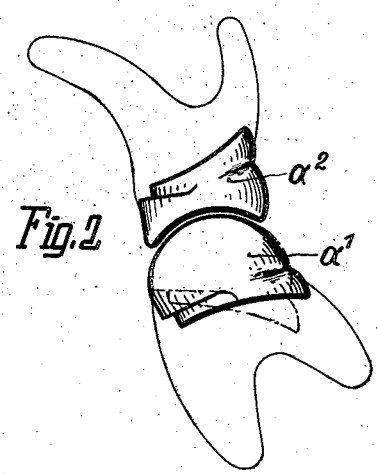
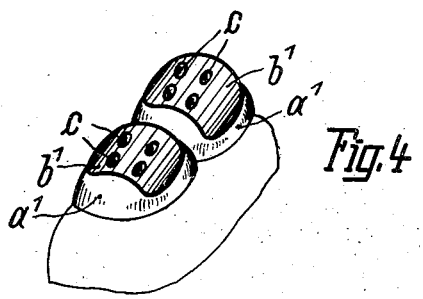
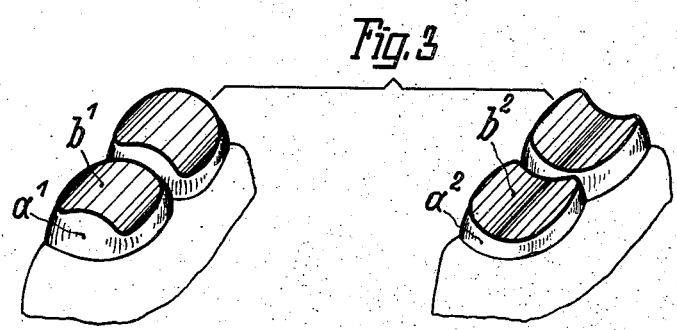
Inventor
Carl Hiltebrandt Patented Sept. 20, 1932

1,878,517

UNITED STATES PATENT OFFICE

CARL HILTEBRANDT, OF ESSEN-ON-THE-RUHR, GERMANY, ASSIGNOR TO DR. HILTEBRANDT ZAHNFABRIK AKTIENGESELLSCHAFT, OF ESSEN-ON-THE-RUHR, GERMANY

ARTIFICIAL TOOTH

Application filed December 31, 1930, Serial No. 505,805, and in Germany July 23, 1930.

My invention relates to artificial teeth and has more particularly reference to artificial molars and their antagonists. The object of my invention is to provide artificial molars and their antagonists with very simple efficacious, and regulatable masticating surfaces which object is attained according to my invention by the masticating surfaces of the two teeth forming in sagittal direction a part of a cylindrical face, the masticating surface of the one tooth being convex while that of the antagonist is concave. This configuration of the masticating surfaces of artificial molars enables the adjustment of the two teeth of a pair in different angular positions according to the varying mutual anatomical positions of the jaws without necessitating any re-dressing of the masticating surfaces, and admits further a mutual movement of the jaws in sagittal direction without alteration of their mutual vertical distance.

I further make the masticating surface of the one tooth in linguo-buccal direction, that is, in the direction toward the cheeks, broader than that of the other tooth. This arrangement results in the fact that even with a position of the teeth differing from the correct linear position their contact surface remains the same and is always equal to the whole masticating surface of the one tooth.

In order that my invention may be more readily understood, two embodiments of my new teeth are illustrated by way of example in the accompanying drawing in which Figure 1 is a front view of an upper and appurtenant lower artificial molar, Figure 2 is a similar view but with the teeth in another mutual angular position, Figure 3 is a perspective top view of pairs of molars according to my invention, and Figure 4 shows a modified form of my new artificial molars.

Referring to the drawing, the one tooth, for instance the lower molar $a^1$, possesses a masticating surface $b^1$ which has a convex shape and forms a portion of a cylindrical face extending in sagittal direction, while the antagonist $a^2$ shows a corresponding concave masticating surface $b^2$ which likewise forms a portion of a cylindrical face. Both these masticating surfaces may have the same or approximately the same radius.

As illustrated in Figures 2 and 3, the masticating surfaces may be entirely smooth or be provided with small indentations $c$, as illustrated in Figure 4. These indentations improve the adhesion of the meat particles between the teeth.

Furthermore, I make the masticating surface of one of the two teeth, for instance $a^1$, as illustrated, in linguo-buccal direction broader than that of the other tooth $a^2$, or inversely. In this way even in cases where the two teeth are not in linear mutual position as illustrated in Figure 1, but in an angular position according to the various anatomical positions of the jaws, as shown in Figure 2, the contact surface of the teeth remains the same and is always equal to the linguo-buccal width of the one of the two teeth.

What I claim and desire to secure by Letters Patent is:—

1. A pair of artificial molars having masticating surfaces forming portions of cylindrical faces extending in sagittal direction, the masticating surface of the one tooth being convex and that of the other tooth concave.

2. A pair of artificial molars having masticating surfaces forming portions of cylindrical faces extending in sagittal direction, the masticating surface of the one tooth being convex and that of the other tooth concave, one of said surfaces in linguo-buccal direction being broader than the other surface.

CARL HILTEBRANDT.